(12) United States Patent
Den et al.

(10) Patent No.: US 8,345,694 B2
(45) Date of Patent: Jan. 1, 2013

(54) NETWORK ADDRESS TRANSLATION FOR TUNNEL MOBILITY

(75) Inventors: Minsh Den, Nashua, NH (US); Steve Kohalmi, Newton, MA (US); Leigh M. Chinitz, Wellesley, MA (US)

(73) Assignee: Airvana, Corp., Chelmsford, MA (US)

( * ) Notice: Subject to any disclaimer, the term of this patent is extended or adjusted under 35 U.S.C. 154(b) by 240 days.

(21) Appl. No.: 11/967,370

(22) Filed: Dec. 31, 2007

(65) Prior Publication Data

US 2009/0168788 A1 Jul. 2, 2009

(51) Int. Cl.
*H04L 12/28* (2006.01)
(52) U.S. Cl. ......................................................... 370/401
(58) Field of Classification Search ..................... None
See application file for complete search history.

(56) References Cited

U.S. PATENT DOCUMENTS

| | | | |
|---|---|---|---|
| 7,039,404 B2* | 5/2006 | Das et al. | 455/435.1 |
| 7,085,836 B1* | 8/2006 | Turner | 709/226 |
| 7,200,865 B1* | 4/2007 | Roscoe et al. | 726/12 |
| 7,447,186 B2* | 11/2008 | Patel et al. | 370/338 |
| 7,453,850 B2* | 11/2008 | Yang et al. | 370/331 |
| 7,613,827 B2* | 11/2009 | Bruck et al. | 709/238 |
| 7,876,728 B1* | 1/2011 | Breau et al. | 370/331 |
| 2001/0016492 A1* | 8/2001 | Igarashi et al. | 455/433 |
| 2002/0080752 A1* | 6/2002 | Johansson et al. | 370/338 |
| 2003/0039234 A1* | 2/2003 | Sharma et al. | 370/338 |
| 2003/0123421 A1* | 7/2003 | Feige et al. | 370/338 |
| 2003/0154236 A1* | 8/2003 | Dar et al. | 709/201 |
| 2003/0219000 A1* | 11/2003 | Magret | 370/338 |
| 2003/0224758 A1* | 12/2003 | O'Neill et al. | 455/411 |
| 2003/0229697 A1* | 12/2003 | Borella | 709/226 |
| 2004/0066760 A1* | 4/2004 | Thubert et al. | 370/329 |
| 2007/0002833 A1* | 1/2007 | Bajic | 370/352 |
| 2007/0008968 A1* | 1/2007 | Baker et al. | 370/390 |
| 2007/0178905 A1* | 8/2007 | El Mghazli et al. | 455/445 |
| 2008/0104273 A1* | 5/2008 | Bruck et al. | 709/238 |
| 2009/0003264 A1* | 1/2009 | Sastry | 370/328 |
| 2009/0144817 A1* | 6/2009 | Kumar et al. | 726/12 |
| 2009/0168788 A1* | 7/2009 | Den et al. | 370/401 |
| 2010/0183018 A1* | 7/2010 | Nikander | 370/401 |
| 2011/0238793 A1* | 9/2011 | Bedare et al. | 709/220 |

OTHER PUBLICATIONS

Eronen, P., "IKEv2 Mobility and Multihoming Protocol (MOBIKE)," *The Internet Society* (Jun. 2006).

* cited by examiner

*Primary Examiner* — Otis L Thompson, Jr.
(74) *Attorney, Agent, or Firm* — Fish & Richardson P.C.

(57) ABSTRACT

An access terminal identity based mobility is provided in which a first network tunnel is established between an access gateway and a first access router, and a second network tunnel is established between the access gateway and a second access router. At the access gateway, source addresses of packets sent from an access terminal to a remote correspondent node are translated by replacing the local address of the access terminal with the public address of the access terminal. The access terminal continuously maintain a communication session with the correspondent node as the access terminal moves from a first location to a second location and switches from accessing the first access router to accessing the second access router. A mapping between the local address and the public address is updated as the access terminal switches from the first access router to the second access router.

24 Claims, 6 Drawing Sheets

NETWORK ADDRESS TRANSLATION FOR TUNNEL MOBILITY

BACKGROUND

The description relates to network address translation for tunnel mobility.

A number of communication protocols, e.g., Mobile Internet Protocol (MIP) and IKEv2 Mobility and Multihoming Protocol (MOBIKE), allow access terminals (e.g., laptops and mobile phones) to roam among sub-networks at various locations while maintaining network connectivity. For example, in a system that complies with Mobile IP, an access terminal can have two addresses, a permanent home address and a care-of address, associated with the network the access terminal is visiting. A communication node that wants to communicate with the access terminal uses the home address of the access terminal as the destination address. The packets are routed through a home agent, which tunnels the packets to the access terminal's care-of address. When the access terminal wants to communicate with a communication node, the access terminal sends the packets to the communicating node through the home agent. For example, in a system that complies with the MOBIKE protocol, an access terminal can establish a security association with a security gateway, and can update its IP address using an informational request when the access terminal moves to a different access point.

SUMMARY

In general, in one aspect, a first network tunnel is established between an access gateway and a first access router that provides a first access point for access terminals; a second network tunnel is established between the access gateway and a second access router that provides a second access point for access terminals; and a public address is assigned to the access terminal having a local address assigned by the first or second access router. At the access gateway, the source addresses of packets sent from an access terminal to a remote correspondent node are translated by replacing the local address of the access terminal with the public address of the access terminal. This enables the access terminal to continuously maintain a communication session with the correspondent node as the access terminal moves from a first location to a second location and switches from accessing the first access router to accessing the second access router. A mapping between the local address and the public address is updated as the access terminal switches from the first access router to the second access router.

Implementations may include one or more of the following features. At the access gateway, destination addresses of the packets sent from the correspondent node are translated to enable the access terminal to continuously receive packets from the correspondent node as the access terminal switches connection from the first access router to the second access router. At the access gateway, information about the mapping between the local address of the access terminal and the corresponding public address are stored in a table. Packets sent through the first network tunnel from the first access router to the access gateway are encapsulated to have a source address that includes an address of the first access router and a destination address that includes an address of the access gateway. Packets sent through the first network tunnel from the access gateway to the first access router are encapsulated to have a source address that includes an address of the access gateway and a destination address that includes an address of the access router.

At the access gateway, an identifier of the access terminal is associated with a local address of the access terminal, and the local address of the access terminal is mapped to the public address of the access terminal. At the access gateway, the identifier of the access terminal and a new local address of the access terminal are received, and the mapping between the local address of the access terminal and the public address of the access terminal is updated. The identifier includes at least one of a network address identifier, an international mobile subscriber identity, and a temporary mobile subscriber identity. The access terminal includes at least one of a notebook computer, a mobile phone, and a personal digital assistant. Establishing the first network tunnel includes establishing a secure network tunnel. Establishing the secure network tunnel includes establishing a secure network tunnel according to IP Security protocol.

In general, in another aspect, network tunnels are established between an access gateway and a plurality of access routers that each provides an access point for access terminals. At the access gateway, source addresses of packets that are sent from an access terminal to a correspondent node are translated, and a mapping between a local address and a public address of the access terminal is maintained to enable the access terminal to continuously send packets to the correspondent node as the access terminal switches connection among different access routers.

Implementations may include one or more of the following features. At the access gateway, destination addresses of the packets that are sent from the correspondent node to the access terminal are translated to enable the access terminal to continuously receive packets from the correspondent node as the access terminal switches connection among different access routers. Establishing network tunnels includes establishing secure network tunnels according to IP Security protocol.

In general, in another aspect, an access gateway establishes network tunnels with a plurality of access routers that provide access points for access terminals. The access gateway includes an address translator to translate source addresses of packets that are sent from an access terminal to a correspondent node, and a table to store information about a mapping between a local address and a public address of the access terminal to enable the access terminal to continuously send packets to the correspondent node as the access terminal switches among different access routers.

Implementations may include one or more of the following features. The address translator also translates destination addresses of packets that are sent from the correspondent node to the access terminal, to enable the access terminal to continuously receive packets from the correspondent node as the access terminal switches among different access routers. The access gateway encapsulates packets sent through the network tunnels to the access routers such that the encapsulated packets have a source address that includes an address of the access gateway and destination addresses that includes the addresses of the access routers. The access gateway updates the local address of the access terminal in the table when the access terminal switches from accessing one of the access routers to another one of the access routers. The access gateway associates an identifier of the access terminal with a local address of the access terminal and maps the local address of the access terminal to a public address of the access terminal. The access gateway receives the identifier of the access terminal and a new local address of the access terminal when the access terminal switches to a new access router, and updates the mapping between the local address and the public address of the access terminal. The access terminal includes at least one of a notebook computer, a mobile phone, and a personal digital assistant. The access gateway establishes secure network tunnels with the access routers.

In general, in another aspect, a system includes means for establishing network tunnels between an access gateway and a plurality of access routers that each provides an access point for access terminals; and means for translating, at the access gateway, source addresses of packets sent from an access terminal to a correspondent node and maintaining a mapping between a local address and a public address of the access terminal to enable the access terminal to continuously send packets to the correspondent node as the access terminal switches among different access routers.

Implementations may include one or more of the following features. The system includes means for translating, at the access gateway, destination addresses of packets sent from the correspondent node to the access terminal to enable the access terminal to continuously receive packets from the correspondent node as the access terminal switches among different access routers.

In general, in another aspect, a medium bearing a computer program capable of controlling an access gateway to process packets by establishing network tunnels between the access gateway and a plurality of access routers that each provides an access point for access terminals; and at the access gateway, translating source addresses of packets sent from an access terminal to a correspondent node and maintaining a mapping between a local address and a public address of the access terminal to enable the access terminal to continuously send packets to the correspondent node as the access terminal switches among different access routers.

These and other aspects and features, and combinations of them, may be expressed as methods, apparatus, systems, means for performing functions, program products, and in other ways.

Advantages of the systems and methods can include one or more of the following. IP mobility can be achieved in situations where the security tunnel is terminated at the access point, not the access terminal. Terminating the security tunnel at the access point rather than the access terminal allows the use of a secure tunnel without imposing a processing overhead on the access terminal, which may have limited processing power. IP mobility can be achieved without the need for a second tunnel (e.g., a Mobile IP tunnel), a mobile terminal client, a mobility proxy agent, or a Home Agent.

DESCRIPTION

Figure 1:
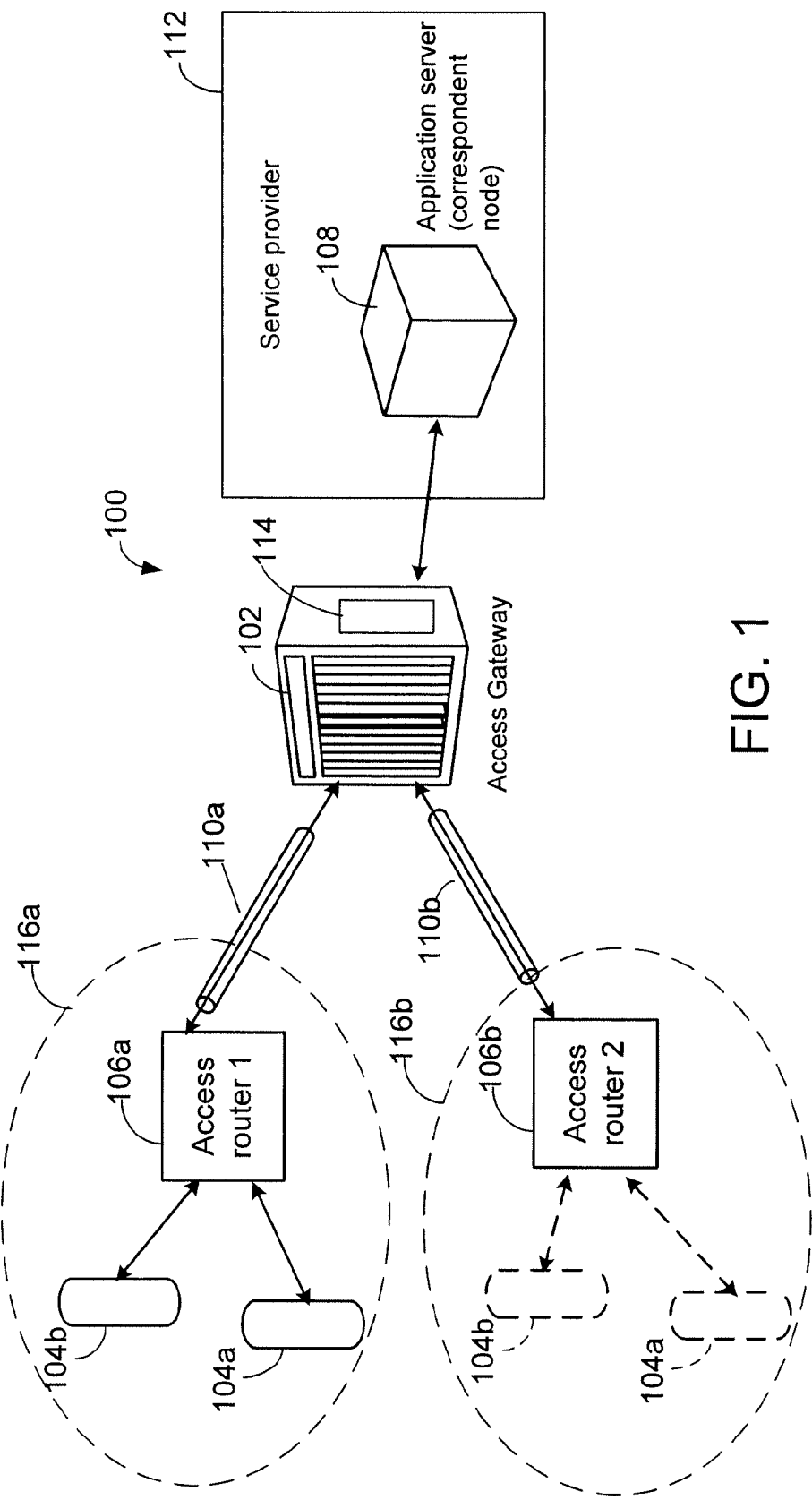
FIG. 1 is a schematic diagram of a telecommunication system.

Referring to FIG. 1, in an example of a telecommunication system 100, an access gateway 102 serves as a gateway for access terminals 104 to access services provided by a service provider 112. Access gateways in this context can be any tunnel-termination devices, such as an IPsec terminating virtual private network (VPN) gateway. The access terminals 104 can be connected to the access gateway 102 through access routers (e.g., 106a or 106b, collectively referenced as 106). The access routers can be any devices that have both wireless and wired interfaces, and serve to relay packets from the wireless to the wired interfaces, and vice versa. A Wi-Fi® access point and an in-building cellular coverage solution such as a femtocell are examples of access gateways. When an access terminal 104, which is a device designed to use the wireless interface of the access routers in order to send packets to, or to receive packets from, the wired side of the access router 106, moves from one location to another and connects to different access routers 106, different local addresses are assigned to the access terminal 104. The access gateway 102 performs network address translation so that the access terminal 104 appears to have a consistent network address during a communication session with a correspondent node 108 of the service provider 112. This enables the access terminals 104 to move freely among various locations serviced by the access routers 106 while maintaining continuous communication sessions with correspondent nodes 108.

The access terminals 104 can be, for example, mobile phones, personal digital assistants, or laptop computers. The access terminals 104 are sometimes referred to as mobile stations. The service provider 112 may provide various services, for example, access to the Internet, e-mail, voice mail, web hosting, audio and video streaming, and downloading of software, etc.

The system 100 terminates the network tunnels at the access routers 106 rather than at the access terminals 104. This allows the use of network tunnels without imposing a processing overhead on the access terminals 104, which may have limited processing power. For example, this is useful when the network tunnels are secure tunnels, in which significant processing is required to encrypt and decrypt the packets traveling in the tunnels.

Each access router 106 functions as an access point that allows multiple access terminals 104 to access services provided by the service provider 112. The access router 106 assigns local addresses to the access terminals 104 connected to the access router 106, and may provide functions such as firewall protection. The links between the access terminals 104 and the access router 106 can be either secured (e.g., by encryption) or un-secured. For example, multiple access routers 106 can be located at different rooms of an office building or house. Multiple access routers 106 can be located at different regions of a city. Users of access terminals 104 can roam among the various rooms of the office building, or various regions of a city, while still being able to continuously access the services provided by the service provider 112.

Each of the access routers 106 establishes a network tunnel (e.g., 110a or 110b, collectively referenced as 110) with the access gateway 102. Original packets transmitted in the tunnels 110 are encapsulated at the transmitting end of the tunnels 110 and decapsulated at the receiving end of the tunnels 110. The encapsulated packets may have new headers with new addressing and routing information that are different from the original packets to enable the encapsulated packets to travel from one end of the tunnel 110 to another end of the tunnel 110. In some implementations, the tunnels 110 are secured tunnels and the original packets are encrypted prior to transferring through the tunnels 110.

In some implementations, the access gateway 102 receives identification information (referred to as "access terminal ID") from the access terminal 104 and authenticates the access terminal 104 before authorizing the access terminal 104 to gain access to the services of the service provider 112. The identification information can be, e.g., a network address identifier (NAI), an international mobile subscriber identity (IMSI), or a temporary mobile subscriber identity (TMSI). In some implementations, the access gateway 102 forwards the access terminal identification information to an authentication server (e.g., an authentication, authorization, and accounting server, or AAA server, not shown in the figure) for authentication and authorization.

When an access terminal 104a initially requests access to a service provided by the service provider 112 and sends identification information for authentication, the access gateway 102 associates the access terminal 104a with a public address and stores information in a mapping table 114 to indicate a mapping between the local and public addresses of the access terminal 104a. This is referred to as generating a binding between the local address and public address.

When the access terminal 104a sends packets to the correspondent node 108, the source address of the packets is the local address of the access terminal 104a, and the destination address of the packets is the address of the correspondent node 108. The packets from the access terminal 104a are received by the first access router 106a, which encapsulates the packets to generate encapsulated packets. The source address of the encapsulated packets is the address of the access router 106a, and the destination address of the encapsulated packets is the address of the access gateway 102.

When the access gateway 102 receives the encapsulated packets, the gateway 102 removes the encapsulation to reveal the original packets from the access terminal 104a. Rather than sending the original packets directly to the destination address, the access gateway 102 translates the source address of the packets to the public address assigned by the access gateway 102, and forwards the packets to the correspondent node 108.

When the correspondent node 108 receives the packets, the source address of the packets is the access gateway server side address associated with the access terminal 104a. From the correspondent node's point of view, the address of the access terminal 104 is the pubic address assigned by the access gateway 102. The correspondent node 108 does not know the local address of the access terminal 104a. When the correspondent node 108 sends packets to the access terminal 104a, the source address of the packets is the address of the correspondent node 108, and the destination address of the packets is the public address of the access terminal 104a assigned by the access gateway 102.

When the access gateway 102 receives packets from the correspondent node 108, the access gateway 102 reviews the destination address of the packets, determines that the destination address is a public address associated with an access terminal, and looks up the mapping table 114 to determine which local address maps to the public address. The access gateway 102 translates the destination address of the packet to the local address of the access terminal 104a and encapsulates the packet before sending the packet through the tunnel 110a. The encapsulated packet has a source address that is the address of the access gateway 102 and a destination address that is the address of the access router 106a.

When the access router 106a receives the encapsulated packet, the access router 106a removes the encapsulation to reveal the packets from the correspondent node 108. The packets now have a source address that is the address of the correspondent node 108 and a destination address that is the local address of the access terminal 104a. The access router 106a forwards the packets to the access terminal 104a according to its local address.

When the access terminal 104a moves to the location 116b, the access terminal 104 sends the access terminal ID to the second access router 104b to request a local address. The access router 106b assigns a second local address to the access terminal 104a. The access router 106b sends the access terminal ID and the local address of the access terminal 104a to the access gateway 102.

The access gateway 102 looks up the mapping table 114 to determine whether there is already a mapping associated with the access terminal ID. The access gateway 102 determines that the access terminal ID is already associated with a local address and a public address of an access terminal 104a. The access gateway 102 updates the local address so that the mapping table 114 now stores information indicating a mapping between the second local address and the public address assigned by the access gateway 102 to the access terminal 104a.

When the access terminal 104a communicates with the correspondent node 108, the access gateway 102 performs network address translation to translate the local address of the access terminal 104a to the corresponding public address, and vice versa, so that the correspondent node 108 can continue to receive packets from and send packets to the access terminal 104a without knowing that the access terminal 104a has moved to different locations and acquired different local addresses.

The term "tunnel mobility" refers to functionality of allowing an access terminal to move to different locations and receive different local addresses from different access routers that establish different network tunnels to an access gateway while maintaining continuous communication sessions with a remote correspondent node 108 through the access gateway.

In a similar manner, when a second access terminal 104b communications with a remote correspondent node 108 through the access gateway 102, the access gateway 102 assigns a second public address to the access terminal 104b, and stores information about a mapping between the local address of the access terminal 104b and the corresponding public address. The access gateway 102 performs network translation to translate the local address of the access terminal 104b to the corresponding public address, and vice versa, so that the correspondent node 108 can continue to receive packets from and send packets to the access terminal 104b when the access terminal 104b moves to different locations and acquires different local addresses.

In some implementations, the system 100 can provide spoofing protection by a combination of ingress filtering at the access router 106 and the security association between the access router 106 and the security gateway 102. The system 100 allows an access terminal 104 to own multiple simultaneous sessions, in which a session identifier is assigned for each session during the access authentication/binding phase.

By enabling NAT-based mobility, the system 100 has several advantages. For example, it is not necessary to send an "anchor" address assigned by the network to the access terminal 104. The access terminal 104 is not required to use the anchor address for binding a connection or sending packets. In system 100, the access terminal 104 is identified by its ID (e.g., network access identifier (NAI)) and shared secret, not by its anchoring address. As long as the network side (including, e.g., the access gateway 102) keeps the NAT binding relationship based on the unique mobile (or session) identifier during the access authentication stage, there is no need for the access terminal 102 to carry this binding relationship and use the anchoring address for packet transmission. By using NAI-authentication and NAT-binding, the access terminal 104 can use any local address (e.g., care-of-address (COA)) without knowing its anchoring address.

Figure 2:
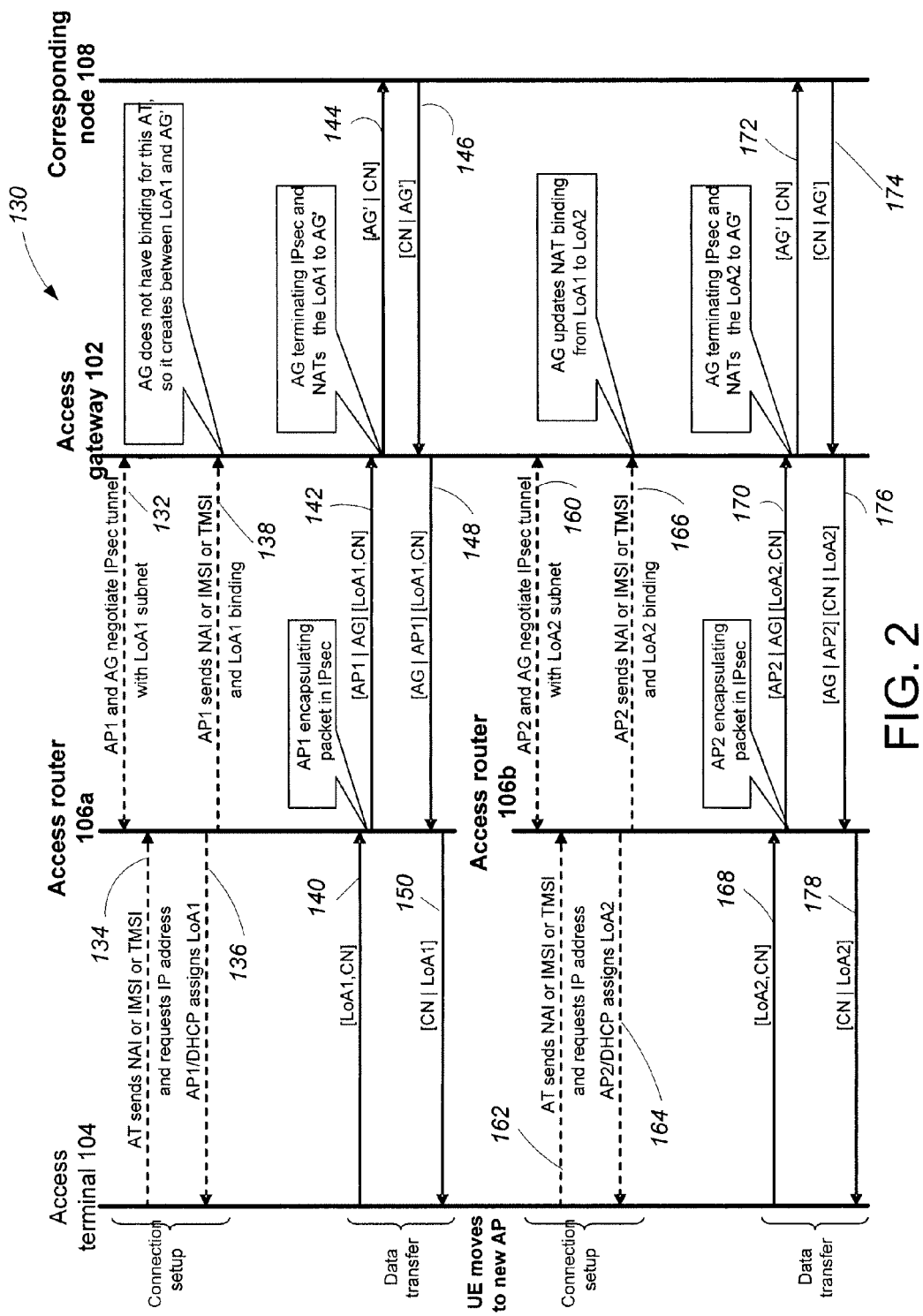
FIGS. 2 and 3 are diagrams of message flows.

FIG. 2 shows an example of a message flow 130 among the access terminal 104, the access routers 106a and 106b, and the access gateway 102 in which the access gateway 102 performs network address translation to enable tunnel mobility. In this example, the access gateway 102 is a security gateway 102, and the tunnel established between the security gateway 102 and the access routers 106a and 106b are secured tunnels, e.g., IPSec tunnels.

The first access router 106a establishes association with the access gateway 102 and receives a subnet of addresses LoA1_subnet it can use to assign local addresses according to the dynamic host configuration protocol (DHCP) (132). The first access router 106a and the access gateway 102 exchange information for establishing an IPSec tunnel (e.g., 110a in FIG. 1), including exchanging security information to enable encryption and decryption of packets transmitted through the IPSec tunnel. The address of the first access router 106a is AP1, and the address of the access gateway 102 is AG.

Similarly, the second access router 106b establishes an IPSec tunnel (e.g., 110b in FIG. 1) with the access gateway 102 and receives a subnet of addresses LoA2_subnet that it can use to assign local addresses according to DHCP (160). The address of the second access router 106b is AP2.

An access terminal 104 associates with the first access router 106a and sends identification information, such as NAI, IMSI, or TMSI to the first access router 106a (134). In response, the first access router 106a assigns a first local IP address LoA1 to the access terminal 104 (136). The first access router 106a sends the access terminal ID (e.g., NAI, IMSI, or TMSI) to the access gateway 102. The access gateway 102 determines that it does not have binding for this access terminal 104, so the access gateway 102 assigns a public address AG' to the access terminal 104 and generates a binding between the first local address LoA1 and the public address AG' (138). The access gateway 102 stores mapping information in a mapping table (e.g., 114) indicating a mapping between the first local address LoA1 and the public address AG'.

The access terminal 104 sends packets to the correspondent node 108, in which the packets have headers with addresses [LoA1|CN] (140). The source address of the packets is LoA1 and the destination address is CN, which is the address of the correspondent node 108. The packets are encapsulated by the first access router 106a and sent through the IPSec tunnel 110a (142). The encapsulated packets have headers with addresses [AP1|AG][LoA1|CN], meaning that the outer layer of the encapsulated packet has a source address AP1 and a destination address AG, and the inner layer of the encapsulated packet has a source address LoA1 and a destination address CN.

The access gateway 102 receives the encapsulated packets, removes the encapsulation, and translates the source address of the packets from LoA1 to the corresponding public address AG' (144). Now, packets from the access terminal 104 to the correspondent node 108 has headers with the address [AG'|CN]. The access gateway 102 sends the packets with the new source address to the correspondent node 108. From the correspondent node's point of view, the address of the access terminal 104 is the public address AG'.

The correspondent node 108 responds by sending packets to the access terminal 104. The packets have headers with addresses [CN|AG] (146). The packets are received by the access gateway 102, which translates the destination address from the public address AG' to the local address LoA1. The access gateway 102 encapsulates the packets so that the encapsulated packets have headers with address [AG|AP1][CN|LoA1] (148).

When the first access router 106a receives the encapsulated packet, the router 106a removes the encapsulation and reveals packets having headers with address [LoA1|CN]. The first access router 106a sends the packets to the access terminal 104 (150) based on the local address LoA1.

When the access terminal 104 moves to a second location and connects to the second access router 106b, the access terminal 104 sends identification information, such as NAI, IMSI, or TMSI to the second access router 106a (162). In response, the second access router 106b assigns a second local IP address LoA2 to the access terminal 104 (164).

The second access router 106b sends the access terminal ID (e.g., NAI, IMSI, or TMSI) to the access gateway 102. The access gateway 102 recognizes the access terminal ID and determines that it already has a binding for this access terminal 104. The access gateway 102 updates the mapping table by replacing the first local address LoA1 with the second local address LoA2 (166). Now the binding is between the second local address LoA2 and the public address AG'.

The access terminal 104 sends packets to the second access router 106b, the packets having headers with addresses [LoA2|CN] (168). The second access router 106b encapsulates the packets and sends the encapsulated packets through the IPSec tunnel 110b (170). The encapsulated packets have headers with addresses [AP2|AG][LoA2|CN].

The access gateway 102 receives the encapsulated packets, removes the encapsulation, and recognizes that the packets have a local address already registered in the mapping table 114. The access terminal 102 translates the source address from the local address LoA2 to the corresponding public address AG'. Now, packets from the access terminal 104 to the correspondent node 108 have headers with the address [AG'|CN]. The access gateway 102 sends the packets with the new source address to the correspondent node 108 (172). The correspondent node 108 continues to receive packets from the public address AG' and recognizes the packets as coming from the access terminal 104.

When the correspondent node 108 sends packets to the access terminal 104, the packets have headers with addresses [CN|AG'] (174). The packets are received by the access gateway 102, which translates the destination address from the public address AG' to the local address LoA2. The access gateway 102 encapsulates the packets so that the encapsulated packets have headers with address [AG|AP2][CN|LoA2] (176).

When the second access router 106b receives the encapsulated packet, the access router 106b removes the encapsulation and reveals packets having headers with address [CN|LoA2]. The second access router 106b sends the packets to the access terminal 104 (178) based on the local address LoA2.

Figure 3:
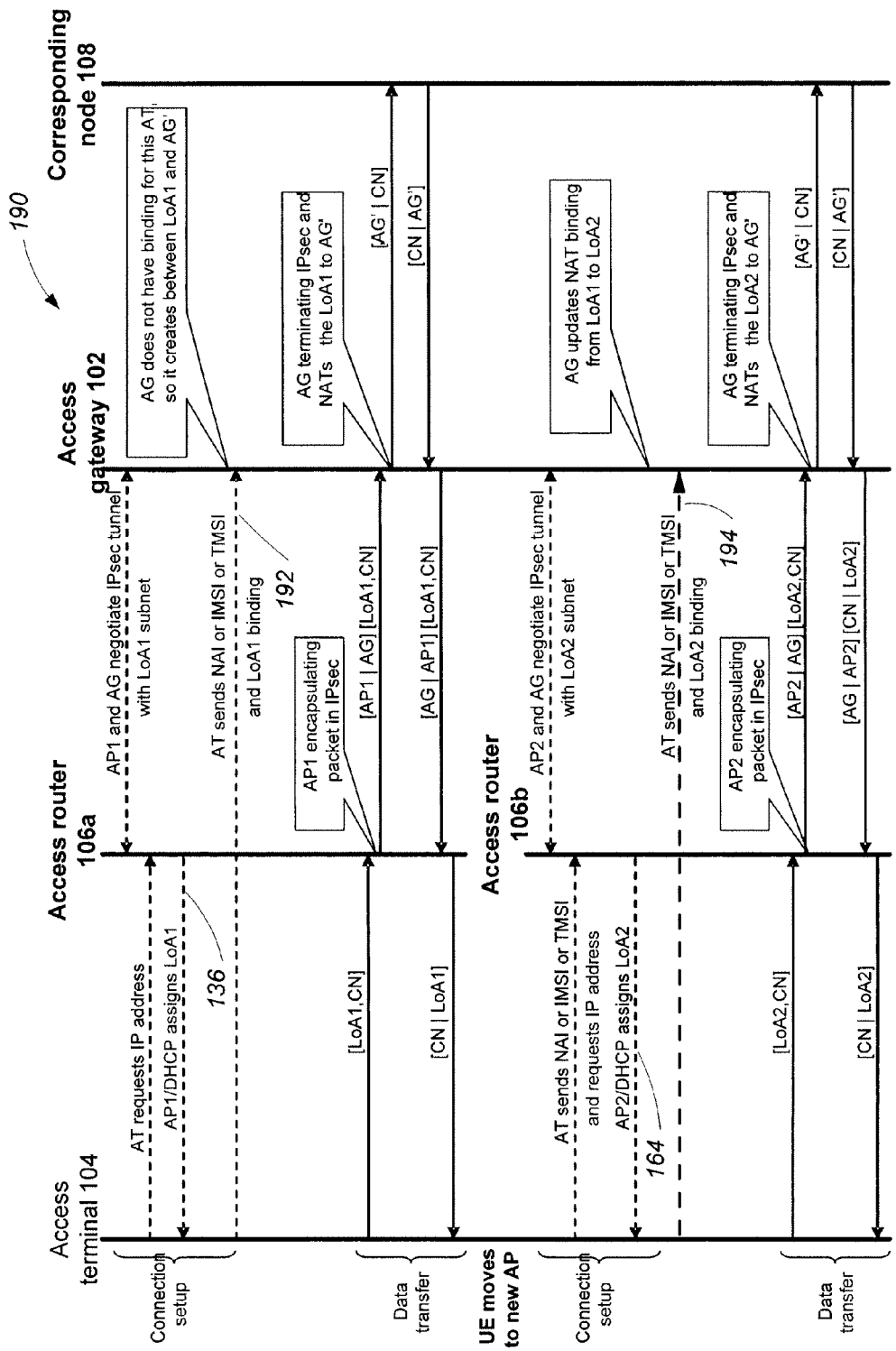

FIG. 3 shows another example of a message flow 190 among the access terminal 104, the access routers 106a and 106b, and the access gateway 102 in which the access gateway 102 performs network address translation to enable tunnel mobility. The difference between the examples in FIGS. 2 and 3 is that, in the example of FIG. 3, the access terminal 104 is involved in the binding process of the access terminal local address and the access gateway server side address.

For example, after the access terminal 104 receives the first local address LoA1 from the first access router 106a (136), the access terminal 104 sends its ID (e.g., NAI, IMSI, or TMSI) to the access gateway 102. The access gateway 102 determines that it does not have binding for this access terminal, so the access gateway 102 assigns a public address AG' to the access terminal 104 and generates a binding between the first local address LoA1 and the corresponding public address AG' (192).

Similarly, when the access terminal 104 moves to the second location 116b and receives a second local address LoA2

(162), the access terminal 104 sends its ID (e.g., NAI, IMSI, or TMSI) to the access gateway 102. The access gateway 102 determines that it already has a binding for this access terminal 104. The access gateway 102 updates the mapping table by replacing the first local address LoA1 with the second local address LoA2 so that the public address AG' now maps to the second local address LoA2 (194).

Figure 4:
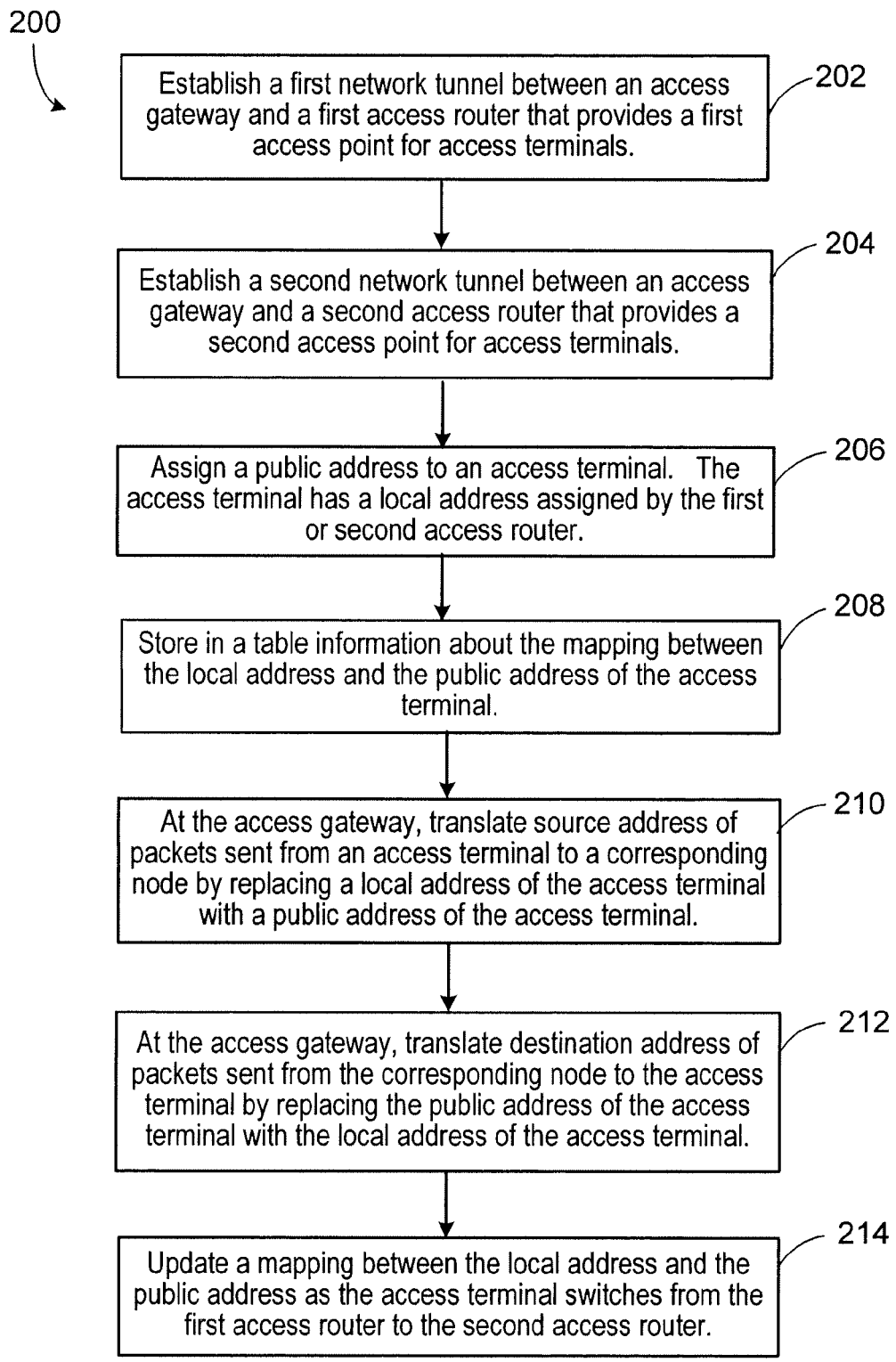
FIG. 4 is a flow diagram of a process.

FIG. 4 is a flow diagram of an example of a process 200 for enabling communication between a mobile access terminal and a remote correspondent node through access routers and an access gateway, where network tunnels are established between the access gateway and the access routers. A first network tunnel is established between an access gateway and a first access router that provides a first access point for access terminals (202). For example, the network tunnel can be the network tunnel 110a of FIG. 1, the access gateway can be the access gateway 102, and the first access router can be the first access router 106a. A second network tunnel is established between the access gateway and a second access router that provides a second access point for access terminals (204). For example, the network tunnel can be the network tunnel 110b and the second access router can be the second access router 106b.

A public address is assigned to the access terminal (206). The access terminal has a local address assigned by the first or second access router. For example, the access gateway 102 assigns a public address to the access terminal 104. Information about the mapping between the local address of the access terminal and the public address of the access gateway is stored in a mapping table (208). For example, the mapping table can be the mapping table 114. At the access gateway, the source address of packets sent from the access terminal to a remote correspondent node is translated by replacing a local address of the access terminal with the corresponding public address (210). At the access gateway, the source address of packets sent from the correspondent node to the access terminal is translated by replacing a public address of the access terminal with the corresponding local address (212). This enables the access terminal to continuously maintain a communication session with the correspondent node as the access terminal moves from a first location to a second location and switches from accessing the first access router to accessing the second access router. For example, the correspondent node can be the correspondent node 108. A mapping between the local address and the public address of the access terminal is updated as the access terminal switches from the first access router to the second access router (214).

Figure 5:
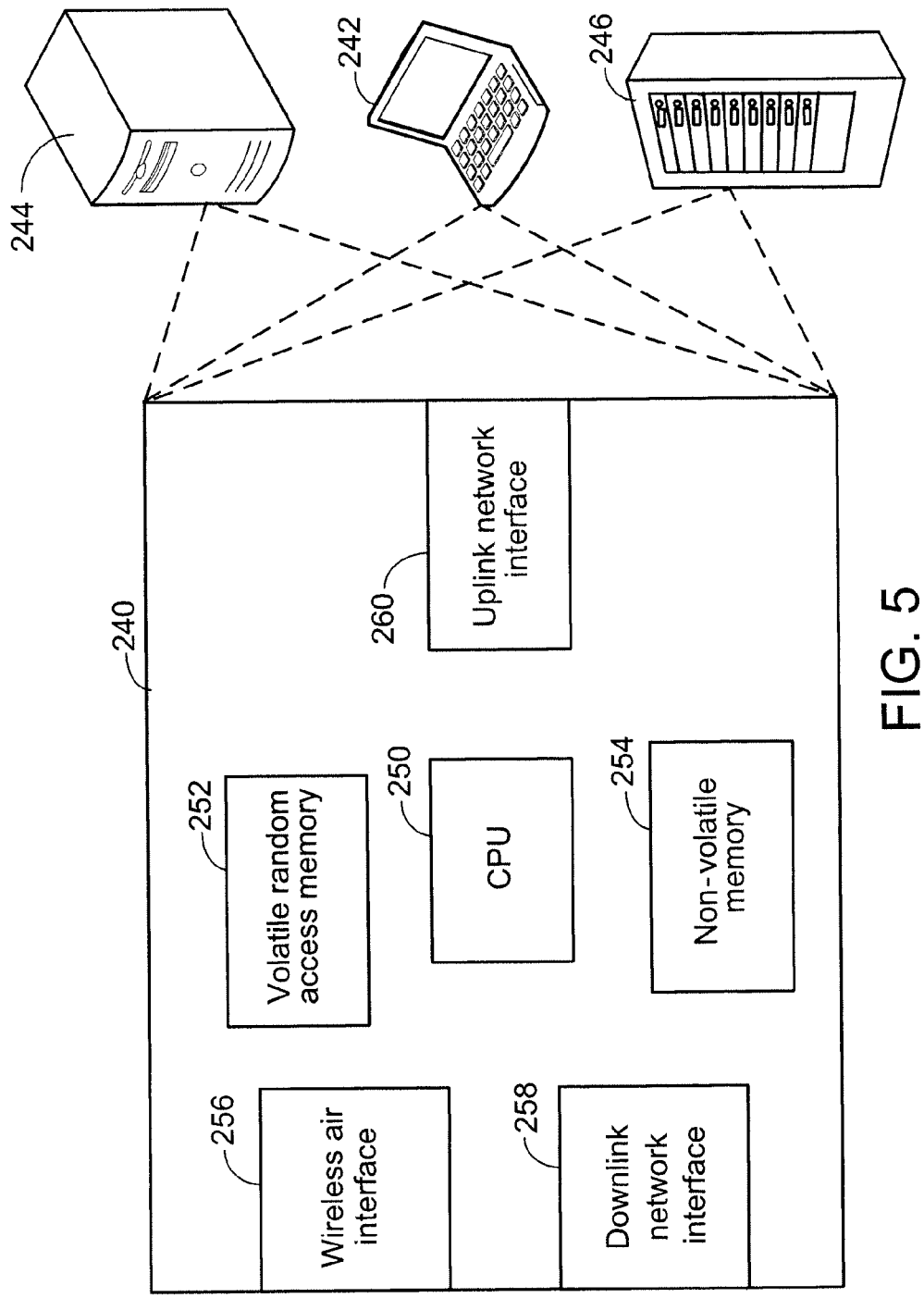
FIGS. 5 and 6 are schematic diagrams of computing devices.

FIG. 5 is a schematic diagram of an example of a computing device 240 that can be used to implement, e.g., the access gateway 102 or the access router 106. The computing device 240 is intended to represent various forms of digital computers, such as laptops 242, desktops 244, rack server systems 246, workstations, servers, blade servers, mainframes, and other appropriate computers. The computing device 240 can be implemented by hardware or a combination of hardware and software. The components shown here, their connections and relationships, and their functions, are meant to be exemplary only, and are not meant to limit implementations of the inventions described and/or claimed in this document.

The computing device 240 includes a central processing unit (CPU) 250, a volatile random access memory 252, a non-volatile memory 254, a wireless air interface 256, a downlink network interface 258, and an uplink networking interface 260. Each of the components 250, 252, 254, 256, 258, and 260 are interconnected using various buses, and may be mounted on a common motherboard or in other manners as appropriate. The CPU 250 can process instructions for execution, including instructions stored in the volatile random access memory 252 or the non-volatile memory 254. In other implementations, multiple processors may be used, as appropriate, along with multiple memories and types of memory. Also, multiple computing devices 240 may be connected, with each device providing portions of the necessary operations (e.g., as a server bank, a group of blade servers, or a multi-processor system).

The non-volatile memory 254 stores software and configuration data, and can be, e.g., a hard disk drive, flash memory, or other types of non-volatile storage. The non-volatile memory 254 can be configured to read data and instructions from a removable storage medium, such as a magnetic tape or optical disc.

The CPU 250 can process instructions for execution within the computing device 240, including instructions stored in the random access memory 252 or on the non-volatile memory 254. A computer program product can be tangibly embodied in an information carrier. The computer program product may also contain instructions that, when executed, perform one or more methods, such as those described above. The information carrier is a computer- or machine-readable medium, such as the volatile random access memory 252, the non-volatile memory 254, or memory on processor 250.

The computing device 240 can send (or receive) information to (or from) other devices through the uplink network interface 260, the downlink network interface 258, and the wireless air interface 256. The wireless air interface 256 includes, e.g., a radio frequency antenna, a radio module to send or receive radio signals, and a digital signal processor to process the radio signals. The radio module and the digital signal processor can be one integrated component or be built with discrete components.

Figure 6:
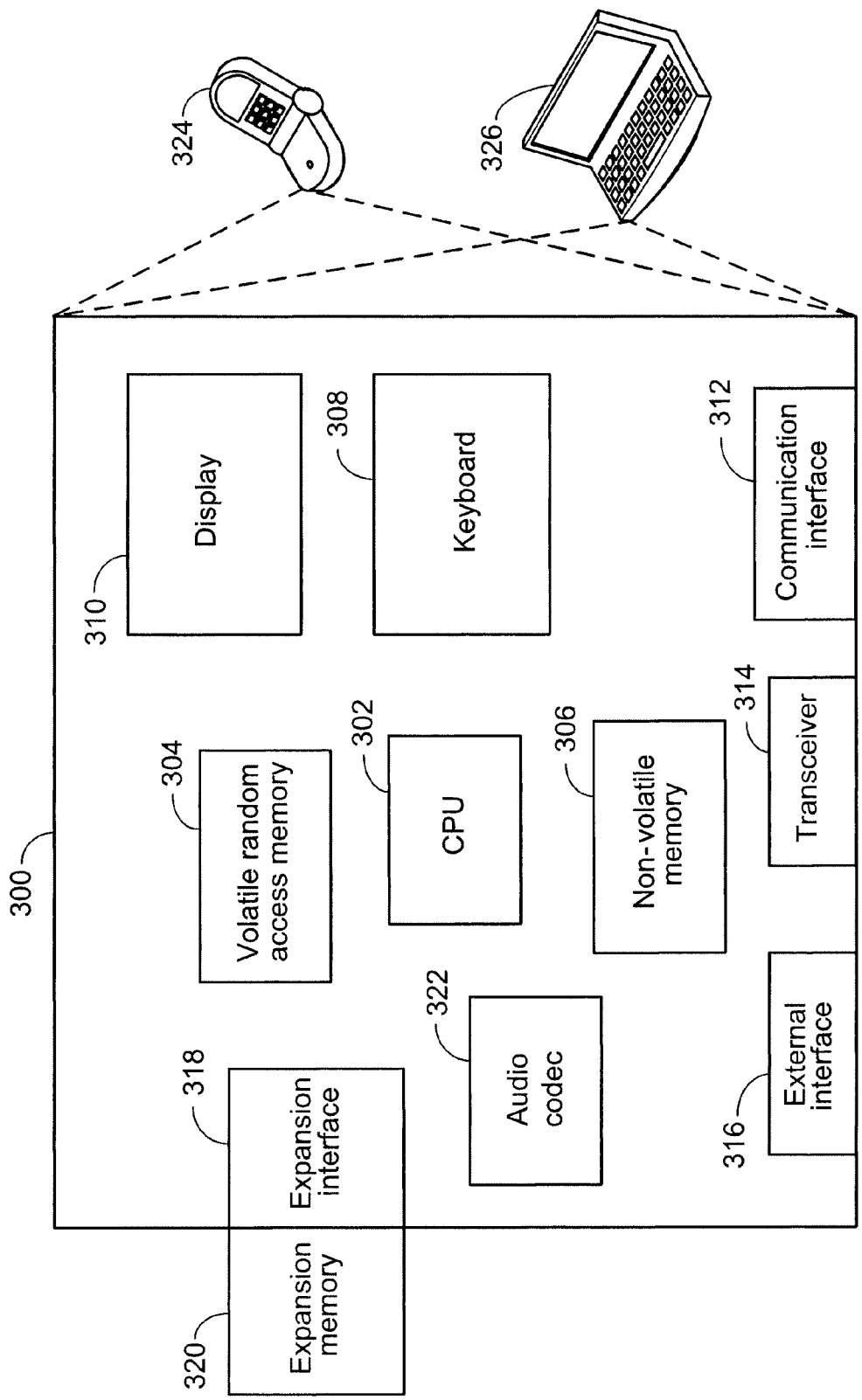

FIG. 6 is a schematic diagram of an example of a computing device 300 that can be used to implement a wireless access terminal 104. The computing device 300 can be, for example, a personal digital assistant, a cellular telephone, or a smartphone. The components shown here, their connections and relationships, and their functions, are meant to be exemplary only, and are not meant to limit implementations of the inventions claimed in this document.

The computing device 300 includes a central processing unit (CPU) 302, volatile random access memory 304, non-volatile memory 306, an input device such as a keyboard 308 (or keypad), an output device such as a display 310, a communication interface 312, a transceiver 314, an external interface 316, and an expansion interface 318, among other components. The computing device 300 may also be provided with a storage device, such as a microdrive or other device, to provide additional storage. Each of the components 302, 304, 306, 308, 310, 312, 314, 316, and 318, are interconnected using various buses, and several of the components may be mounted on a common motherboard or in other manners as appropriate.

The CPU 302 can execute instructions within the computing device 300, including instructions stored in the volatile random access memory 304 and non-volatile memory 306. The CPU 302 may be implemented as a chipset of chips that include separate and multiple analog and digital processors. The CPU 302 may provide, for example, coordination of the other components of the device 300, such as control of user interfaces, applications run by device 300, and wireless communication by device 300.

The keyboard 308 allows the user to enter commands, and the display 310 allows the device 300 to output information to the user. The display 310 may be, for example, a thin film transistor) liquid crystal display or an organic light emitting diode display, or other appropriate display technology. An external interface 316 may be provide to enable near area communication of the device 300 with other devices. The external interface 316 may provide, for example, for wired communication in some implementations, or for wireless communication in other implementations, and multiple interfaces may also be used.

The non-volatile memory 306 may include, for example, flash memory. Expansion memory 320 may also be provided and connected to the device 300 through the expansion interface 318, which may include, for example, a SIMM (Single In Line Memory Module) card interface. Such expansion memory 320 may provide extra storage space for the device 300, or may also store applications or other information for the device 300. The expansion memory 320 may include instructions to carry out or supplement the processes described above, and may include security information. For example, the expansion memory 320 may be provided as a security module for the device 300, and may be programmed with instructions that permit secure use of the device 300. In addition, security applications may be provided via the SIMM cards, along with additional information, such as placing identifying information on the SIMM card in a non-hackable manner.

In one implementation, a computer program product is tangibly embodied in an information carrier. The computer program product contains instructions that, when executed, perform one or more methods, such as those described above. The information carrier is a computer- or machine-readable medium, such as the volatile random access memory 304, non-volatile memory 306, expansion memory 320, or memory on the CPU 302.

Device 300 may communicate wirelessly through communication interface 312, which may include digital signal processing circuitry where necessary. Communication interface 312 may provide for communications under various modes or protocols. Such communication may occur, for example, through radio-frequency transceiver 314. In addition, short-range communication may occur, such as using a Bluetooth, WiFi, or other such transceiver (not shown).

Device 300 may communicate audibly using an audio codec 322, which may receive spoken information from the user and convert it to usable digital information. The audio codec 322 may generate audible sound for the user, such as through a speaker, e.g., in a handset of device 300.

The computing device 300 may be implemented in a number of different forms, as shown in the figure. For example, it may be implemented as a cellular telephone 324, a part of a smart phone 326, personal digital assistant, or other similar mobile device.

Various implementations of the access gateway 102, access router 106, access terminal 104, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, and may have input and/or output devices.

The computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of embodiments of the invention have been described. Nevertheless, it will be understood that various modifications may be made without departing from the spirit and scope of the invention. For example, various forms of the message flow described above may be used, with steps re-ordered, added, or removed. The access terminal 104, the access router 106, and the security gateway 102 can comply with protocols other than those described above. The service provider 112 may provide services other than those described above, and the access terminal 104 can establish communication sessions with the correspondent node 108 for purposes other than those described above.

Accordingly, other embodiments are within the scope of the following claims.

What is claimed is:

1. A method comprising:
    establishing a first network tunnel between an access gateway and a first access router that provides a first access point for access terminals, the access gateway providing a first subnet of addresses to the first access router that the first access router can use to assign local addresses to the access terminals;
    establishing a second network tunnel between the access gateway and a second access router that provides a second access point for access terminals;
    assigning, by the access gateway, a public address to the access terminal having a local address assigned by the first or second access router, the access gateway assigning different public addresses to different access terminals connected to the access gateway through corresponding access router or routers;
    at the access gateway, translating source addresses of packets sent from an access terminal to a remote correspondent node by replacing the local address of the access terminal with the public address of the access terminal, to enable the access terminal to continuously maintain a communication session with the correspondent node as the access terminal moves from a first location to a second location and switches from accessing the first access router to accessing the second access router; and
    updating a mapping between the local address and the public address as the access terminal switches from the first access router to the second access router.

2. The method of claim 1, comprising, at the access gateway, translating destination addresses of the packets sent from the correspondent node to enable the access terminal to continuously receive packets from the correspondent node as the access terminal switches connection from the first access router to the second access router.

3. The method of claim 1, comprising, at the access gateway, storing in a table information about the mapping between the local address of the access terminal and the corresponding public address.

4. The method of claim 1 wherein packets sent through the first network tunnel from the first access router to the access gateway are encapsulated to have a source address comprising an address of the first access router and a destination address comprising an address of the access gateway.

5. The method of claim 1, comprising encapsulating packets sent through the first network tunnel from the access gateway to the first access router and causing the encapsulated packets to have a source address comprising an address of the access gateway and a destination address comprising an address of the access router.

6. The method of claim 1, comprising, at the access gateway, associating an identifier of the access terminal with a local address of the access terminal, and mapping the local address of the access terminal to the public address of the access terminal.

7. The method of claim 6, comprising, at the access gateway, receiving the identifier of the access terminal and a new local address of the access terminal, and updating the mapping between the local address of the access terminal and the public address of the access terminal.

8. The method of claim 6 wherein the identifier comprises at least one of a network address identifier, an international mobile subscriber identity, and a temporary mobile subscriber identity.

9. The method of claim 1 wherein the access terminal comprises at least one of a notebook computer, a mobile phone, and a personal digital assistant.

10. The method of claim 1 wherein establishing the first network tunnel comprises establishing a secure network tunnel.

11. The method of claim 10 wherein establishing the secure network tunnel comprises establishing a secure network tunnel according to IP Security protocol.

12. A method comprising:
establishing network tunnels between an access gateway and a plurality of access routers that each provides an access point for access terminals
at the access gateway, providing a subnet of addresses to each of the access routers that each access router can use to assign local addresses to the access terminals;
at the access gateway, assigning a public address to the access terminal, the access gateway assigning different public addresses to different access terminals connected to the access gateway through corresponding access router or routers;
at the access gateway, translating source addresses of packets that are sent from an access terminal to a correspondent node by replacing the local address of the access terminal with the public address of the terminal, and maintaining a mapping between the local address and the public address of the access terminal to enable the access terminal to continuously send packets to the correspondent node as the access terminal switches connection among different access routers; and
at the access gateway, updating the mapping between the local address and the public address as the access terminal switches connection among different access routers.

13. The method of claim 12, comprising, at the access gateway, translating destination addresses of the packets that are sent from the correspondent node to the access terminal, to enable the access terminal to continuously receive packets from the correspondent node as the access terminal switches connection among different access routers.

14. The method of claim 12 wherein establishing network tunnels comprises establishing secure network tunnels according to IP Security protocol.

15. An apparatus comprising:
an access gateway to establish network tunnels with a plurality of access routers that provide access points for access terminals, the access gateway providing a subnet of addresses to at least one of the access routers that the access router can use to assign local addresses to the access terminals, the access gateway comprising
an address translator to translate source addresses of packets that are sent from an access terminal to a correspondent node by replacing the local address of the access terminal with a public address of the access terminal, and
a table to store information about a mapping between the local address and the public address of the access terminal to enable the access terminal to continuously send packets to the correspondent node as the access terminal switches among different access routers,
wherein the access gateway assigns different public addresses to different access terminals connected to the access gateway through corresponding access router or routers, and
wherein the access gateway updates the local address of the access terminal in the table when the access terminal switches from accessing one of the access routers to another one of the access routers.

16. The apparatus of claim 15 wherein the address translator also translates destination addresses of packets that are sent from the correspondent node to the access terminal, to enable the access terminal to continuously receive packets from the correspondent node as the access terminal switches among different access routers.

17. The apparatus of claim 15 wherein the access gateway encapsulates packets sent through the network tunnels to the access routers such that the encapsulated packets have a source address comprising an address of the access gateway and destination addresses comprising the addresses of the access routers.

18. The apparatus of claim 15 wherein the access gateway associates an identifier of the access terminal with a local address of the access terminal and maps the local address of the access terminal to a public address of the access terminal.

19. The apparatus of claim 18 wherein the access gateway receives the identifier of the access terminal and a new local address of the access terminal when the access terminal switches to a new access router, and updates the mapping between the local address and the public address of the access terminal.

20. The apparatus of claim 18 wherein the access terminal comprises at least one of a notebook computer, a mobile phone, and a personal digital assistant.

21. The apparatus of claim 18 wherein the access gateway establishes secure network tunnels with the access routers.

22. A system comprising:
means for establishing network tunnels between an access gateway and a plurality of access routers that each provides an access point for access terminals, the access gateway providing a subnet of addresses to at least one of the access routers that the access router can use to assign local addresses to the access terminals;
means for assigning public addresses to the access terminals, the access gateway assigning different public addresses to different access terminals connected to the access gateway through corresponding access router or routers;
means for translating, at the access gateway, source addresses of packets sent from an access terminal to a correspondent node by replacing the local address of the access terminal with the public address of the terminal, and maintaining a mapping between a local address and a public address of the access terminal to enable the access terminal to continuously send packets to the correspondent node as the access terminal switches among different access routers; and means for updating the mapping between the local address and the public address as the access terminal switches connection among different access routers.

23. The system of claim 22, comprising means for translating, at the access gateway, destination addresses of packets sent from the correspondent node to the access terminal to enable the access terminal to continuously receive packets from the correspondent node as the access terminal switches among different access routers.

24. A non-transitory computer-readable medium having a computer program capable of controlling an access gateway to process packets by:

establishing network tunnels between the access gateway and a plurality of access routers that each provides an access point for access terminals, the access gateway providing a subnet of addresses to at least one of the access routers that the access router can use to assign local addresses to the access terminals; and at the access gateway, translating source addresses of packets sent from an access terminal to a correspondent node by replacing the local address of the access terminal with a public address of the access terminal and maintaining a mapping between a local address and a public address of the access terminal to enable the access terminal to continuously send packets to the correspondent node as the access terminal switches among different access routers;

wherein the access gateway assigns different public addresses to different access terminals connected to the access gateway through corresponding access router or routers;

wherein the access gateway updates the mapping between the local address and the public address as the access terminal switches connection among different access routers.

\* \* \* \* \*